United States Patent

Green

(10) Patent No.: US 7,119,512 B2
(45) Date of Patent: Oct. 10, 2006

(54) SWITCHED RELUCTANCE MACHINE CONTROL SYSTEM AND METHOD

(75) Inventor: Charles E. Green, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 136 days.

(21) Appl. No.: 10/711,715

(22) Filed: Sep. 30, 2004

(65) Prior Publication Data

US 2005/0067998 A1 Mar. 31, 2005

Related U.S. Application Data

(60) Provisional application No. 60/481,442, filed on Sep. 30, 2003.

(51) Int. Cl.
*H02P 7/36* (2006.01)

(52) U.S. Cl. ............... 318/701; 318/700; 318/717; 318/721

(58) Field of Classification Search ............ 318/701, 318/700, 717, 721
See application file for complete search history.

(56) References Cited

U.S. PATENT DOCUMENTS

| | | | |
|---|---|---|---|
| 4,959,596 A | 9/1990 | MacMinn | |
| 5,497,064 A | 3/1996 | Van Sistine | |
| 5,525,887 A | 6/1996 | Van Sistine | |
| 6,028,406 A | 2/2000 | Birk | |
| 6,242,874 B1 | 6/2001 | Kalpathi et al. | |
| 6,291,949 B1 | 9/2001 | Green | |
| 6,351,094 B1 | 2/2002 | Green | |
| 6,396,237 B1 | 5/2002 | Mayes | |
| 2002/0063547 A1 * | 5/2002 | Turner et al. | 318/701 |
| 2002/0125851 A1 * | 9/2002 | Gallegos-Lopez et al. | 318/701 |
| 2003/0072120 A1 * | 4/2003 | Ishikawa et al. | 361/93.9 |

FOREIGN PATENT DOCUMENTS

EP 0656158 B1 7/1995

OTHER PUBLICATIONS

Gallegos–Lopez et al, High–grade Position Estimation for SRM Drives Using Flux linkage/Current Correction Model, IEEE, 1998.
Gallegos–Lopez et al, High–Grade Position Estimation for SRM Drives Using Flux Linkage/Current Correction Model, IEEE Trans on Ind App, vol. 35, No. 4, Jul./Aug. 1999, 859–869.
Panda, Sensorless Control of Switched Reluctance Motor Drive with Self–Measured Flux–Linkage Characteristics, IEEE, 2000.
Thompson et al, Rotor Position Estimation in a Switched Reluctance Drive Using Recursive Least Squares, IEEE Trans on Ind. Elect, vol. 47, No. 2, Apr. 2000, 368–379.

* cited by examiner

*Primary Examiner*—Karen Masih

(57) ABSTRACT

A switched reluctance machine system includes a stator, a rotor situated to rotate relative to the stator and a plurality of phase windings situated in the stator. A power supply is connected to the phase windings via power converter and a controller outputs control signals to the power converter to selectively apply power to the phase windings. The controller receives feedback signals from the phase windings that provide phase current information to the controller. The controller is programmed to analyze the phase current information and control the power converter to inject diagnostic pulses into any of the phase windings in which current in the phase winding is below a predetermined level. The rotor position is determined based on detected characteristics of the diagnostic pulses, and the characteristics may be weighted, for example, in response to an estimated position of the diagnostic pulses.

28 Claims, 5 Drawing Sheets

SWITCHED RELUCTANCE MACHINE CONTROL SYSTEM AND METHOD

CROSS REFERENCE TO RELATED APPLICATIONS

This application is a nonprovisional application of U.S. Provisional Patent Application No. 60/481,442, filed on Sep. 30, 2003, which is incorporated by reference.

BACKGROUND

The present disclosure relates generally to switched reluctance machines, and more particularly, to sensorless rotor position detection for switched reluctance machines.

In general, a reluctance machine is an electrical machine in which torque is produced by the tendency of its movable part to move into a position where the reluctance of a magnetic circuit is minimized where the inductance of the exciting winding is maximized. In one type of reluctance machine, circuitry is provided for detecting the angular position of the rotor and energizing the phase windings as a function of the rotor position. This type of reluctance machine is generally known as a switched reluctance machine. It may be operated as a motor or a generator. The characteristics of such switched reluctance machines are well-known and are described in, for example, "The Characteristics, Design and Application of Switched Reluctance Motors and Drives" by Stephenson and Blake, PCIM '93, Nurnberg, Jun. 21–24, 1993, incorporated herein by reference. That paper describes the features of the switched reluctance machine produce the characteristic cyclically varying inductance of the phase windings.

The principal components of a typical switched reluctance drive system include a DC power supply, for example, a battery or rectified and filtered AC supply that can be fixed or variable in magnitude. The DC voltage provided by the power supply is switched across the phase windings of the motor by a power converter under the control of an electronic control unit. The switching must be correctly synchronized to the angle of rotation of the rotor for proper operation of the drive. A rotor position detector is typically employed to supply signals indicating the angular position of the rotor. The output of the rotor position detector may also be used to generate a speed feedback signal. Current feedback is provided in the controller by a current transducer that samples current in one or more of the phase windings.

The rotor position detector may take many forms. In some systems, the rotor position detector can comprise a rotor position transducer that provides output signals that change state each time the rotor rotates to a position where a different switching arrangement of the devices in the power converter is required. In other systems, the position detector can be a software algorithm that calculates or estimates the position from other monitored parameters of the drive system. These systems are often called "sensorless position detector systems" since they do not use a physical transducer associated with the rotor that determines the angular position of the rotor. Many different approaches have been adopted in the quest for a reliable sensorless system.

The energization of the phase windings in a switched reluctance machine depends on detection of the angular position of the rotor. This may be explained by reference to FIGS. 1 and 2, which illustrate the switching of a reluctance machine operating as a motor. FIG. 1 generally shows a rotor 24 with a rotor pole 20 approaching a stator pole 21 of a stator 25 according to arrow 22. As illustrated in FIG. 1, a portion 23 of a complete phase winding is wound around the stator pole 21. When the portion 23 of the phase winding around stator pole 21 is energized, a force will be exerted on the rotor, tending to pull rotor pole 20 into alignment with stator pole 21. FIG. 2 generally shows typical switching circuitry in the power converter that controls the energization of the phase winding, including the portion 23 around stator pole 21. When switches 31 and 32 are closed, the phase winding is coupled to the source of DC power and is energized. Many other configurations of lamination geometry, winding topology and switching circuitry are known in the art: some of these are discussed in the incorporated Stephenson and Blake paper cited above. When the phase winding of a switched reluctance machine is energized in the manner described above, the magnetic field set up by the flux in the magnetic circuit gives rise to the circumferential forces which, as described, act to pull the rotor poles into line with the stator poles.

In general, the phase winding is energized to effect rotation of the rotor as follows. At a first angular position of the rotor (called the "turn-on angle", $T_{ON}$), the controller provides switching signals to turn on both switching devices 31 and 32. When the switching devices 31 and 32 are on, the phase winding is coupled to the DC bus, causing an increasing magnetic flux to be established in the machine. The magnetic flux produces a magnetic field in the air gap that acts on the rotor poles to produce the motoring torque. The magnetic flux in the machine is supported by the magnetomotive force ("mmf"), which is provided by a current flowing from the DC supply through the switches 31 and 32 and the phase winding. Current feedback is generally employed and the magnitude of the phase current is controlled by chopping the current by rapidly switching one or both of switching devices 31 and/or 32 on and off. FIG. 3a shows a typical current waveform in the chopping mode of operation, where the current is chopped between two fixed levels. In motoring operation, the turn-on angle $T_{ON}$ is often chosen to be the rotor position where the center-line of an inter-polar space on the rotor is aligned with the center-line of a stator pole, but may be some other angle.

In many systems, the phase winding remains connected to the DC bus (or connected intermittently if chopping is employed) until the rotor rotates such that it reaches what is referred to as the "freewheeling angle" $T_{FW}$. When the rotor reaches an angular position corresponding to the freewheeling angle (the position shown in FIG. 1), one of the switches, for example 31, is turned off. Consequently, the current flowing through the phase winding will continue to flow, but will now flow through only one of the switches (in this example 32) and through only one of the diodes 33/34 (in this example 34). During the freewheeling period, the voltage drop across the phase winding is small, and the flux remains substantially constant. The circuit remains in this freewheeling condition until the rotor rotates to an angular position known as the "turn-off angle" $T_{OFF}$, (when the center-line of the rotor pole is aligned with that of the stator pole). When the rotor reaches the turn-off angle, both switches 31 and 32 are turned off and the current in phase winding 23 begins to flow through diodes 33 and 34. The diodes 33 and 34 then apply the DC voltage from the DC bus in the opposite sense, causing the magnetic flux in the machine (and therefore the phase current) to decrease. It is known in the art to use other switching angles and other current control regimes.

As the speed of the machine rises, there is less time for the current to rise to the chopping level, and the drive is normally run in a "single-pulse" mode of operation. In this mode, the turn-on, freewheel and turn-off angles are chosen as a function of, for example, speed and load torque. Some systems do not use an angular period of freewheeling switches 31 and 32 are switched on and off simultaneously. FIG. 3b shows a typical such single-pulse current waveform where the freewheel angle is zero. It is well-known that the values of turn-on, freewheel and turn-off angles can be predetermined and stored in some suitable format for retrieval by the control system as required, or can be calculated or deduced in real time.

In low speed operation, most known sensorless position detection systems that are suitable for operation in the chopping mode use diagnostic pulses of some sort that are injected into an idle, or "inactive" phase winding (no phase excitation current applied to the winding). By monitoring the result of these pulses, the control system is able to estimate the rotor position and determine when the main excitation should be applied to and removed from the phase windings.

As the speed rises, the time remaining for diagnosis becomes inadequate to inject sufficient pulses for a reliable estimate of position, and the system becomes unstable because there are times when none of the phases is in a condition for diagnosis and synchronism of the control system with rotor position is lost. Rather than use diagnostic pulses, high-speed detection systems may take readings from the phase energization waveform at a predetermined reference point, then appropriate corrections are made. One such method for operating in the high-speed (single-pulse) mode is described in EP-A-0573198 ("Ray"), which is incorporated herein by reference. Ray discloses a method of flux and current measurement leading to predictions of rotor position.

Many other sensorless position detection systems are reviewed and categorized in "Sensorless Methods for Determining the Rotor Position of Switched Reluctance Motors", Ray et al, Proc EPE'93 Conference, Brighton, UK, September 13–16, 93, Vol 6, pp 7–13, incorporated herein by reference, which concludes that none of these methods is entirely satisfactory for operation over the entire operating range.

The present application addresses these and other shortcomings associated with the prior art.

SUMMARY

In accordance with aspects of the teachings of the present disclosure, a switched reluctance machine control system and method of determining rotor position are provided. The switched reluctance machine system includes a stator, a rotor situated to rotate relative to the stator and a plurality of phase windings situated in the stator. A power supply is connected to the phase windings via a power converter and a controller outputs control signals to the power converter to selectively apply power to the phase windings. The controller receives signals from the phase windings that provide current feedback to the controller, including an indication of current level in the windings.

The controller is programmed to analyze the phase current information and control the power converter to inject diagnostic pulses into any of the phase windings in which current is below a predetermined level to determine the position of the rotor relative to the stator. A first diagnostic pulse may be injected into a first one of the phase windings during an active period of the first phase when the current in the phase winding is below a predetermined level, and a second diagnostic pulse may be injected into a second one of the phase windings during an inactive period of the second phase. With switched reluctance machine systems having three or more phases, additional diagnostic pulses may further be injected into one or more of the additional phase windings during inactive periods of those phases. The rotor position is determined based on detected characteristics of the diagnostic pulses, and the characteristics may be weighted, for example, in response to an estimated position of the diagnostic pulses.

BRIEF DESCRIPTION OF DRAWINGS

Other objects and advantages of the invention will become apparent upon reading the following detailed description and upon reference to the drawings in which.

Figure 1:
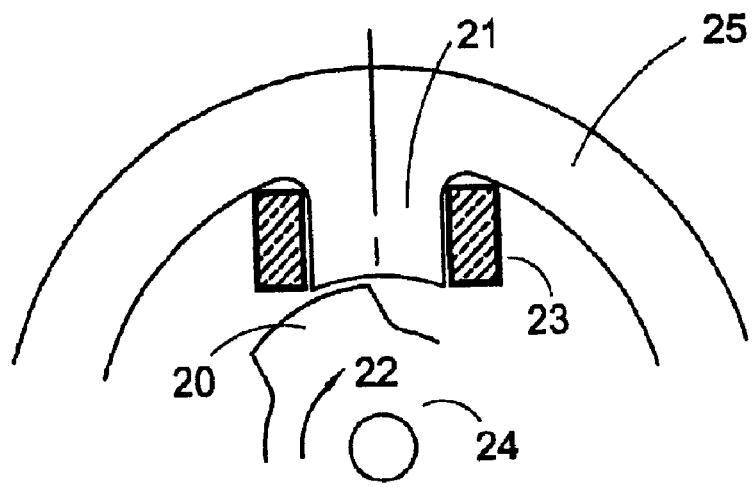
FIG. 1 generally illustrates portions of a prior art switched reluctance machine.
Figure 2:
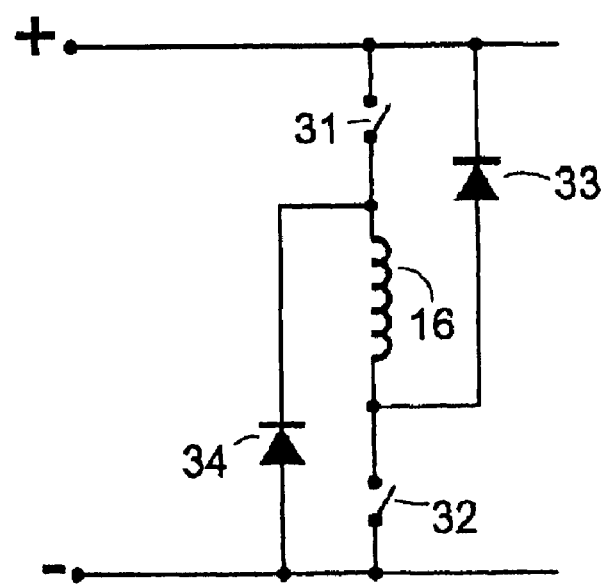
FIG. 2 is a circuit diagram illustrating a typical switching arrangement for the power converter of a switched reluctance machine.
Figure 3A:
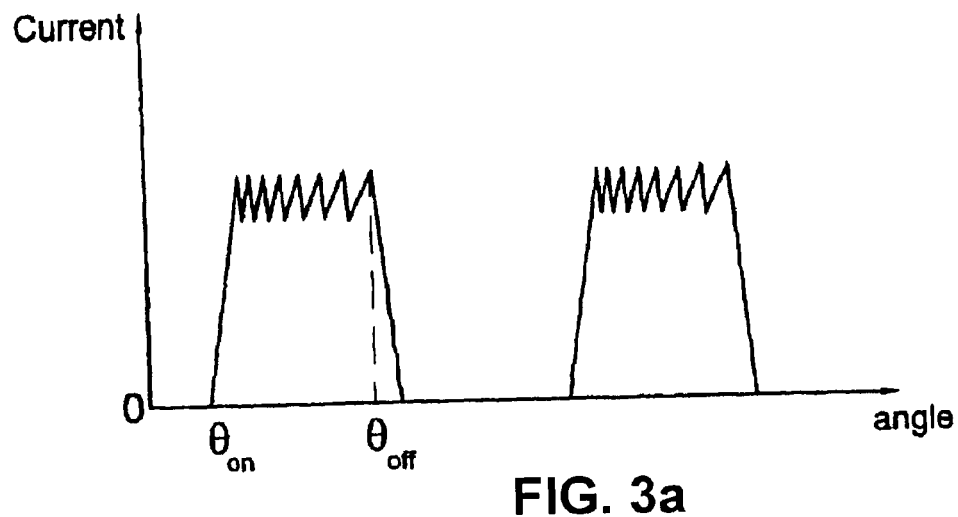
FIGS. 3a and 3b are current waveforms illustrating chopping and single-pulse phase energization modes, respectively, for a switched reluctance machine.
Figure 3B:
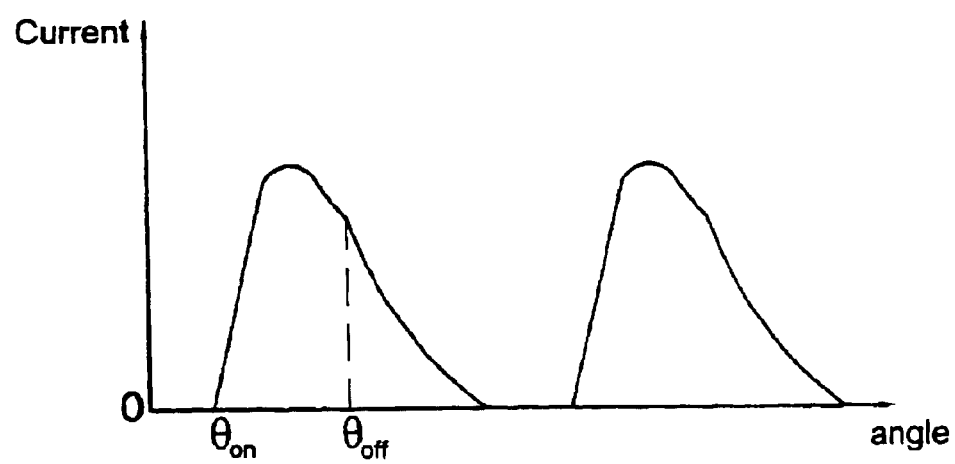

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 4:
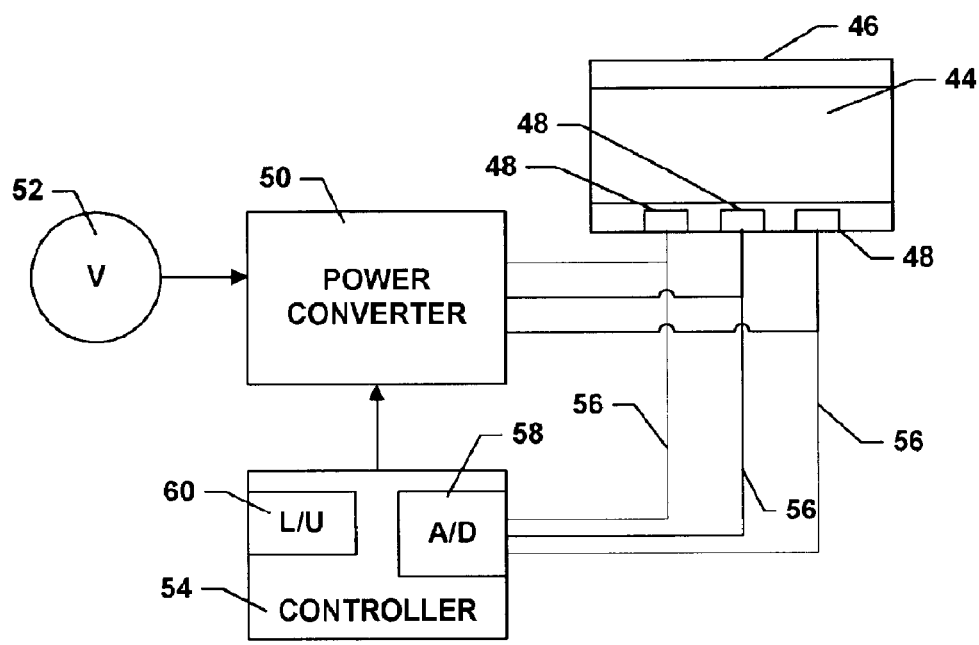
FIG. 4 is a block diagram illustrating a switched reluctance machine system in accordance with exemplary embodiments of the present invention.

FIG. 4 illustrates a switched reluctance machine system in accordance with exemplary embodiments of the present invention. The switched reluctance machine system includes a reluctance machine 42 having a rotor 44 mounted to rotate in a stator 46. The reluctance machine 42 is a polyphase machine—the illustrated embodiment has three phase windings 48 that are separately energizable. The phase windings 48 are connected to a DC power supply 52 via a power converter 50 that is controlled by a controller 54 to selectively apply power to the phase windings 48. The input DC power supply 52 can be, for example, a battery or rectified and filtered AC supply and can be fixed or variable in magnitude.

The power converter 50 includes a conventional switch arrangement connected to each phase winding 48. The controller 54 receives current information 56 from the windings 48 via a current sensing devices, such as a Hall-effect device. The current sensing devices may conveniently also supply signals useful for other current monitoring functions in the system. The controller may include, for example, an application specific integrated circuit (ASIC), a properly programmed microprocessor or microcontroller, or a number of discrete chips or analog circuits could be used.

The A/D converter 58 is arranged to digitize the received signals representative of the current values 56. The look-up table 60 is accessed by the controller 54 to convert values of detected current levels into rotor angles. The values of rotor angle for a given current are machine-specific, but should be common to the currents detected on the phase windings 48 on the assumption that the phase arrangements are substantially similar. However, separate look-up tables for each phase may be used where the phase characteristics differ to any great extent.

The controller 54 is programmed to run a slow-speed (chop) control scheme and a high-speed (single-pulse) control scheme. With some known slow-speed sensorless position detection systems, rotor position is determined by injecting a diagnostic pulse of flux linkage of a predetermined magnitude into an inactive or idle phase winding (in motoring operation, no excitation current being applied to the winding to produce torque). The flux linkage is the time integral of the electromotive force (emf) applied to the winding, it is thus given by:

$$\psi = \int (V - iR) dt$$

in which $\psi$ is the flux linkage of the coil, V is the effective supply voltage (less any voltage drops in the power converter 50), i is the coil current and R is the coil resistance. The current is detected by the current sensing device 56 in each phase winding 48 according to the flux linkage pulses injected. The integration of (V−iR) can be performed in the controller 54 according to known methods. Hence, a diagnostic pulse is produced by applying the voltage from the supply 52; monitoring the increasing value of the integral; and removing the voltage when the desired value of flux linkage is reached. Knowing the values of flux linkage and current, the rotor position can be looked up in the table 60 to give the value of rotor angle corresponding to these values. It will be appreciated that, if the value of iR is small as compared to voltage, the iR term in the equation can be ignored for practical purposes.

Figure 5:
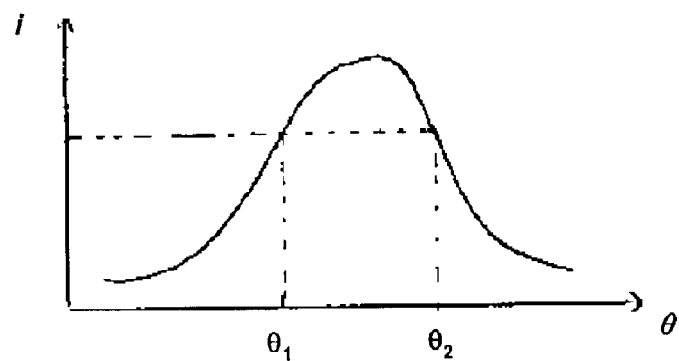
FIG. 5 illustrates a current waveform showing how a diagnostic current reading in a single phase could have two possible rotor positions.

However, as shown in FIG. 5, a diagnostic current reading in a single phase (for example, phase A) could have two possible rotor positions the measurement of current and the subsequent calculation of $\theta_1$ would also correspond to the position of $\theta_2$. Thus, at least some limited knowledge of rotor position is required to determine rotor position diagnosing only a single phase at a given time. For example, if the particular half of the inductance profile that the rotor is under is known, the diagnostic pulses can be injected in the appropriate region of the inductance profile to determine position using a single phase.

Figure 6:
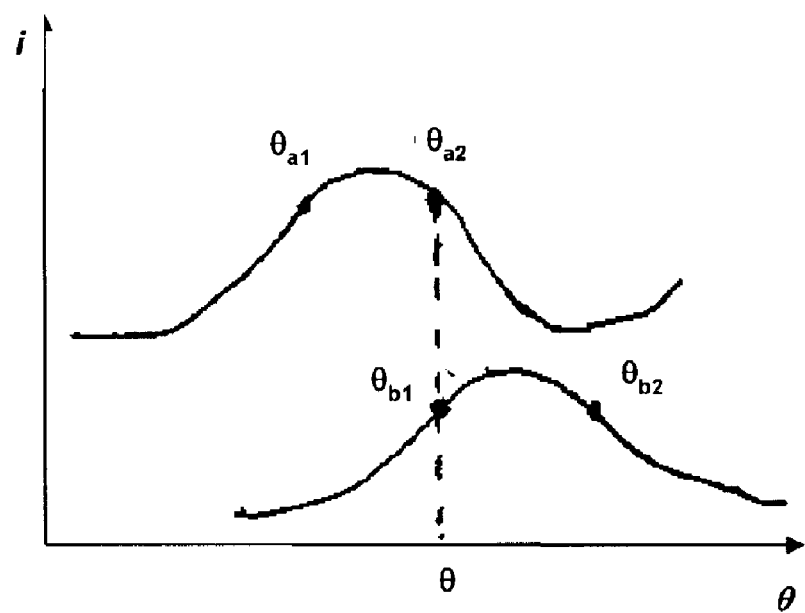
FIG. 6 illustrates two current waveforms showing how a unique position can be determined analyzing two phases.

If a simultaneous measurement of a second phase (phase B as shown in FIG. 6) is made, positions $\theta_{a1}$ and $\theta_{a1}$ are found for phase A and positions $\theta_{b1}$ and $\theta_{b1}$ are found for phase B. Since a unique position must exist at any one angle, only the two points that match ($\theta_{a2}$ and $\theta_{b1}$) can be correct and the rotor position is thereby determined. This is based on the measurements being taken practically simultaneously using diagnostic pulses of flux-linkage.

At high speeds there often is not sufficient space or time for diagnostic pulses, especially with high phase currents, so high-speed sensorless position detection methods typically work off of the active waveform only. As with low-speed mode, the high-speed mode typically also requires at least some knowledge of position. For example, in one known high-speed method, the excitation current waveform of an active phase is interrogated and data is taken from the phase only once per inductance cycle. An angular reference point is predetermined and current and flux-linkage are measured at the predetermined reference point. Any error between the measured and expected flux-linkage is used to derive a positional error and hence a revised estimate of position.

If the torque demand is low, there may not be sufficient current, or no current at all, at the reference position. This would make it difficult or impossible to accurately determine position with the high-speed method. Moreover, diagnostic readings taken at points where the inductance profile is especially flat, such as at or near the maximum and minimum inductance points, are especially susceptible to noise and motor variations. This is especially troublesome when the rotor is "lost" no information regarding the rotor position is available possibly resulting in picking the wrong pair of positions. Similarly, at start up there may be no knowledge of rotor position, making it difficult or impossible to determine rotor position by diagnosing only a single phase.

However, if the active phase current is low or absent, there likely is space for diagnostic pulses to be inserted in the active portion of the phase (the portion where energization current would otherwise be applied). In accordance with aspects of the present invention, rather than using diagnostic pulses in only a specific region of the inductance profile in a single phase, and only for relatively low speeds when running, diagnostic pulses may be inserted anywhere there is "space" for instance, when the current in a phase is below some predetermined level. This allows diagnosing in any phase, and multiple phases maybe diagnosed simultaneously. For instance, if one phase is near the Lmax or Lmin position, another phase can be diagnosed that provides more information, adding accuracy.

Accordingly, a first diagnostic pulse is injected into a first one of the phase windings during an active period of a first phase when the current in the phase winding is below a predetermined level in other words, when space is available for inserting the diagnostic pulse. The diagnostic pulses may have a predetermined maximum value of current or flux linkage. This is generally illustrated in the flow diagram of FIG. 7. If there is space in the active phase the current in the phase is below a predetermined level one or more diagnostic pulses are applied to the phase windings of the active phase in block 120. Further, one or more diagnostic pulses are also injected into another one or more of the phase windings during an inactive period of those phases (block 114). For the exemplary three-phase machine illustrated in FIG. 4, diagnostic pulses could be applied to all three of the phase windings 48 during the active phase period on one of the phases. The rotor position relative to the stator is determined from the detected characteristics of the diagnosed pulses in block 122. In certain embodiments of the invention, the diagnostic pulses injected in the windings of the active and the inactive phases (blocks 120, 114) are injected substantially simultaneously.

Figure 7:
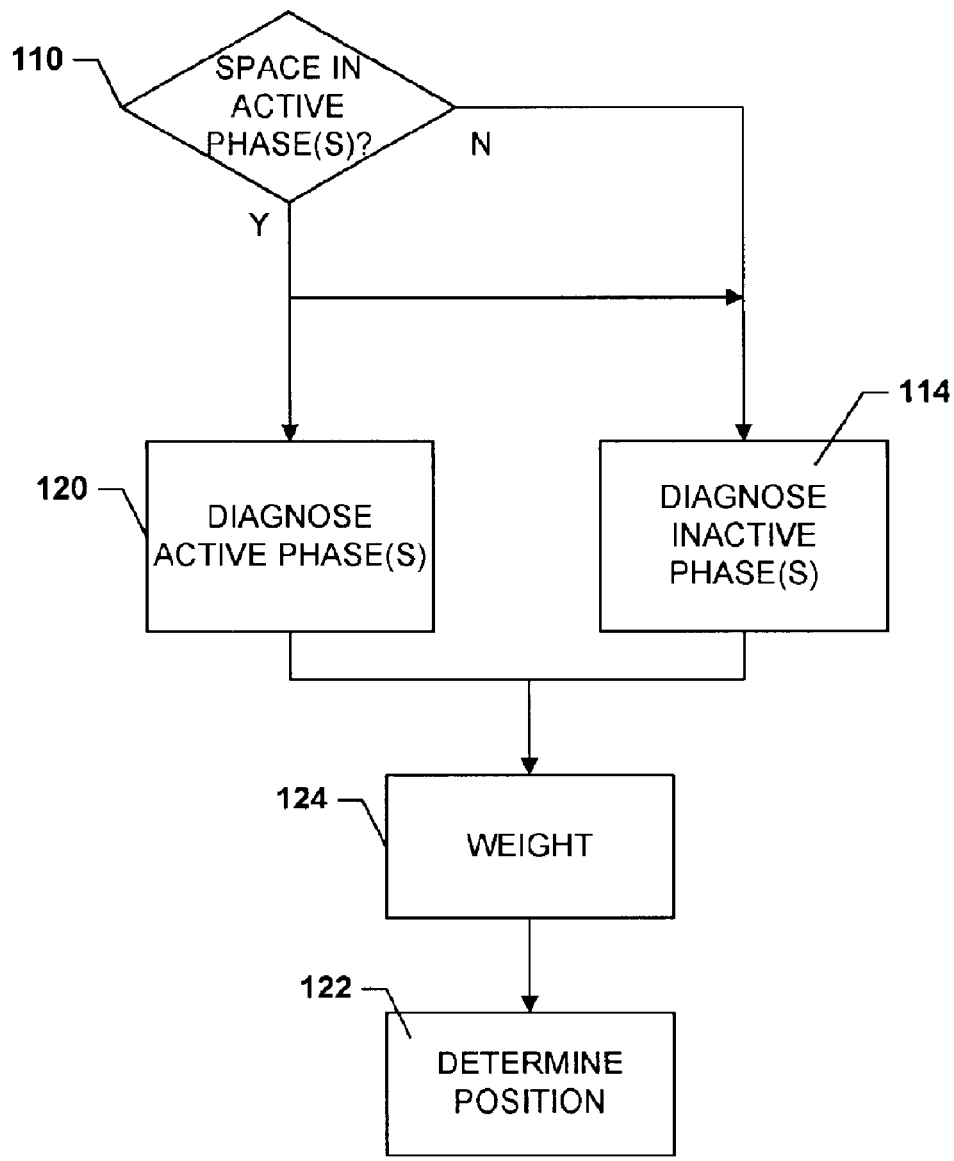
FIG. 7 is a flow diagram illustrating a method for determining rotor position in accordance with exemplary embodiments of the present invention.

In certain exemplary embodiments, the multiple diagnostic readings are weighted as shown in block 124 of FIG. 7. This allows position estimates from areas where the inductance is changing more rapidly (which tend to be more accurate) to have a greater influence on the overall position estimate. For instance, at a given point, the weighing may be based on the gradient of the inductance curve plus some offset. Thus, if readings are taken from three phases, the overall position can be calculated as $$\frac{(w_a\theta_a + w_b\theta_b + w_c\theta_c)}{(w_a + w_b + w_c)}$$

where θ is the position estimated from a phase and w is the weighting based on that position estimate.

Figure 8:
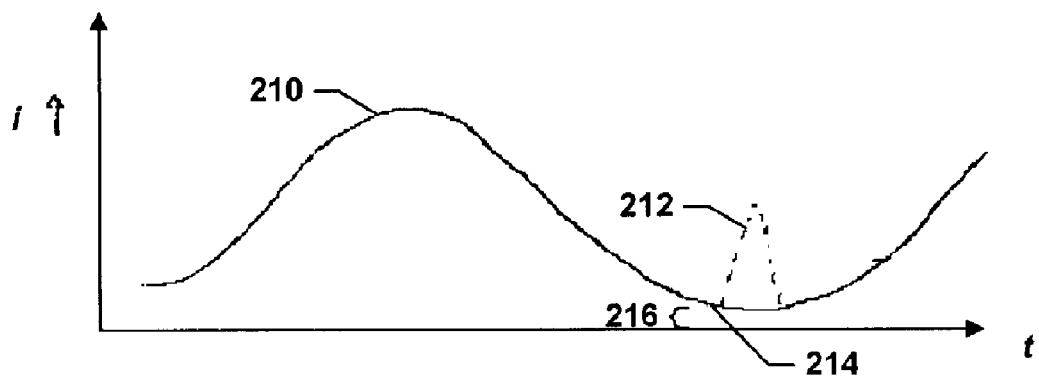
FIG. 8 illustrates a phase current waveform with a diagnostic pulse superimposed thereon.

If space is available in an active phase for the insertion of diagnostic pulses, it may be necessary to adjust the current value when the measurement is taken if some current is present in the phase winding if integration is started from zero. A phase current waveform 210 is shown in FIG. 8. A diagnostic pulse 212 is injected when space is available the current falls to a predetermined level at the point in the waveform 210 indicated generally at point 214. Simply reading the current for the diagnostic pulse 212 will give an incorrect result, however, because the current due to the pulse 212 is superimposed on the current already in the phase, indicated by reference number 216. By subtracting the current 216 that exists at the start of the diagnostic pulse 212 to determine current due to the pulse 216 alone, the correct position can be determined.

In instances where an initial knowledge of rotor position is not available, such as start up and lost rotor, where diagnosing using a single phase may be inaccurate, multiple phases are diagnosed in accordance with certain aspects of the present invention. Similarly, with low-speed operation, accuracy is improved as diagnosing is not limited to a single phase at a given time. Diagnostic pulses are also utilized with some high-speed operation modes (such as low torque), improving accuracy. Thus, applying diagnostic pulses to all phases whenever space exists provides a rotor position determination method that may cover starting, lost rotor, low-speed and high-speed (low torque).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of determining rotor position in a polyphase switched reluctance machine having a stator, a rotor and a plurality of phases of energizable windings, the method comprising:
    receiving signals indicating current levels in the phase windings;
    injecting diagnostic pulses into any of the phase windings where the current level is below a predetermined level; and
    determining the rotor position relative to the stator from detected characteristics of the diagnostic pulses.

2. The method of claim 1, wherein injecting diagnostic pulses includes:
    injecting a first diagnostic pulse into a first one of the phase windings during an active period of the first phase when the current in the phase winding is below a predetermined level; and
    injecting a second diagnostic pulse into a second one of the phase windings during an inactive period of the second phase.

3. The method of claim 2, wherein the first and second diagnostic pulses are injected substantially simultaneously.

4. The method of claim 1, wherein the diagnostic pulses have a predetermined maximum value of current.

5. The method of claim 1, wherein the diagnostic pulses have a predetermined maximum value of flux linkage.

6. The method of claim 1, wherein the diagnostic pulses are injected by switching a supply voltage across the phase winding.

7. The method of claim 2, wherein the switched reluctance machine is a three-phase machine.

8. The method of claim 7, further comprising injecting a third diagnostic pulse into a third one of the phase windings during an inactive period of the third phase.

9. The method of claim 8, wherein the first, second and third diagnostic pulses are injected substantially simultaneously.

10. The method of claim 1, wherein determining the rotor position includes weighting the detected characteristics of the diagnostic pulses in response to an estimated position of the rotor.

11. The method of claim 10, wherein the detected characteristics are weighted according to $$\frac{(w_a\theta_a + w_b\theta_b + w_c\theta_c)}{(w_a + w_b + w_c)}$$

where θ is the position estimated from the respective phase and w is the weighting based on that position estimate.

12. The method of claim 1, wherein injecting diagnostic pulses includes subtracting the current value present in the phase winding prior to the injection of the diagnostic pulses.

13. A switched reluctance machine system, comprising:
    a stator;
    a rotor situated to rotate relative to the stator;
    a plurality of phase windings situated in the stator;
    a power converter;
    a power supply connected to the phase windings via the power converter; and
    a controller outputting control signals to the power converter to selectively apply power to the phase windings, the controller receiving signals from the phase windings providing current feedback;
    the controller being programmed to analyze the phase current feedback and control the power converter to inject diagnostic pulses into any of the phase windings in which current is below a predetermined level to determine the position of the rotor relative to the stator.

14. The switched reluctance machine system of claim 13, wherein the controller is programmed to inject a first diagnostic pulse into a first one of the phase windings during an active period of the first phase when the current in the phase winding is below a predetermined level, and inject a second diagnostic pulse into a second one of the phase windings during an inactive period of the second phase.

15. The switched reluctance machine system of claim 14, wherein the switched reluctance machine is a three-phase machine.

16. The switched reluctance machine system of claim 15, wherein the controller is programmed to inject a third diagnostic pulse into a third one of the phase windings during an inactive period of the third phase.

17. The switched reluctance machine system of claim 16, wherein the controller is programmed to inject the first, second and third diagnostic pulses substantially simultaneously.

18. The switched reluctance machine system of claim 16, wherein the controller is programmed to determine the rotor position based on detected characteristics of the first, second and third diagnostic pulses.

19. The switched reluctance machine system of claim 14, wherein the controller is programmed to weight the detected characteristics of the first and second pulses in response to an estimated position of the diagnostic pulses.

20. The switched reluctance machine system of claim 19, wherein the controller is programmed to weight the detected characteristics according to $$\frac{(w_a\theta_a + w_b\theta_b + w_c\theta_c)}{(w_a + w_b + w_c)}$$

where θ is the position estimated from the respective phase and w is the weighting based on that position estimate.

21. The switched reluctance machine system of claim 13, wherein the controller is programmed to subtract the current level present in the windings prior to the injection of the diagnostic pulses.

22. A control system for a switched reluctance machine having a stator, a rotor situated to rotate relative to the stator, a plurality of phase windings situated in the stator, a power converter, and a power supply connected to the phase windings via the power converter, the control system comprising:
output terminals for providing control signals to the power converter to selectively apply power to the phase windings; and
input terminals for receiving current feedback signals from the phase windings; and
a controller connected to the input and output terminals, the controller being programmed to analyze the phase current information and control the power converter to inject diagnostic pulses into any of the phase windings when the current in the phase winding is below a predetermined level to determine the position of the rotor relative to the stator.

23. The control system of claim 22, wherein the controller is programmed to inject a first diagnostic pulse into a first one of the phase windings during an active period of the first phase when the current in the phase winding is below a predetermined level, and inject a second diagnostic pulse into a second one of the phase windings during an inactive period of the second phase.

24. The control system of claim 23, wherein the controller is programmed to inject a third diagnostic pulse into a third one of the phase windings during an inactive period of the third phase.

25. The control system of claim 24, wherein the controller is programmed to determine the rotor position based on detected characteristics of the first, second and third diagnostic pulses.

26. The control system of claim 23, wherein the controller is programmed to weight the detected characteristics of the diagnostic pulses in response to an estimated position of the rotor.

27. The control system of claim 26, wherein the controller is programmed to weight the detected characteristics according to $$\frac{(w_a\theta_a + w_b\theta_b + w_c\theta_c)}{(w_a + w_b + w_c)}$$

where θ is the position estimated from the respective phase and w is the weighting based on that position estimate.

28. The control system of claim 23, wherein the controller is programmed to subtract the current level present in the phase winding prior to the injection of the diagnostic pulse.

* * * * *